United States Patent [19]

Backlund

[11] 4,232,821
[45] Nov. 11, 1980

[54] HEATING AND VENTILATION SYSTEM

[76] Inventor: Anders D. Backlund, Holmen, S-820 90 Ytterhogdal, Sweden

[21] Appl. No.: 902,620

[22] Filed: May 4, 1978

[30] Foreign Application Priority Data

May 6, 1977 [SE] Sweden .............................. 7705311

[51] Int. Cl.³ ............................................ G05D 23/00
[52] U.S. Cl. ..................................... 237/2 B; 62/325; 165/DIG. 12
[58] Field of Search .................. 237/2 B, 50, 53, 1 A; 98/36, 33 A, 40 D; 62/79, 238 E, 324 D, 325; 165/DIG. 12

[56] References Cited

U.S. PATENT DOCUMENTS

| | | | |
|---|---|---|---|
| 1,360,457 | 11/1920 | Sklovsky | 432/179 |
| 2,008,407 | 7/1935 | Stoever | 62/325 |
| 2,077,599 | 4/1937 | Wales | 237/55 |
| 2,468,626 | 4/1949 | Graham | 62/325 |
| 3,143,952 | 8/1964 | Simons | 98/36 |
| 3,623,549 | 11/1971 | Smith, Jr. | 165/DIG. 12 |
| 3,732,703 | 5/1973 | Nordstrom et al. | 62/324 D |
| 3,867,979 | 2/1975 | Carrasse et al. | 62/79 |
| 3,968,833 | 7/1976 | Strindehag et al. | 165/DIG. 2 |
| 3,981,445 | 9/1976 | Custer | 98/96 |

FOREIGN PATENT DOCUMENTS

| | | | |
|---|---|---|---|
| 2231469 | 3/1974 | Fed. Rep. of Germany | 165/DIG. 12 |
| 2558137 | 7/1976 | Fed. Rep. of Germany | 237/2 B |

Primary Examiner—Henry C. Yuen
Attorney, Agent, or Firm—Steele, Gould & Fried

[57] ABSTRACT

A system for heating and ventilating objects and spaces surrounded by an outer covering, such as rooms in buildings. The system includes a heat pumping device for converting low-temperature energy to high-temperature energy useful for heating purposes. The condenser as well as the evaporator of the heat pumping device are divided into several series-connected sections operating at progressively or step-wise decreasing condenser temperatures and progressively increasing evaporator temperatures. The outer covering of the space or object to be heated contains an air inlet system and an air outlet system, each of said systems having several series-connected sections located at different distances from the outer surfaces of the covering, thus being subjected to different temperatures related to the temperature gradient through the outer covering. The individual condenser sections are contacted with the air of corresponding sections of the air inlet system, and the individual evaporator sections are in turn contacted with the air of the outlet system. The inlet and outlet air systems are preferably in heat exchanging contact with each other within the outer covering.

3 Claims, 2 Drawing Figures

HEATING AND VENTILATION SYSTEM

BACKGROUND OF THE INVENTION

The present invention relates to a new and improved heating and ventilation system of the type comprising a so-called heat pumping device for converting low-temperature heat energy into high-temperature heat energy useful for e.g. heating objects and spaces surrounded by a preferably heat insulated outer covering, such as rooms in a building.

Heat pumping devices of various designs have for a long time been used for converting readily available low-temperature heat energy—for example the low-temperature heat energy contained in cold air, cold water or in the ground during winter time—into a condition of higher temperature, useful for heating purposes. As is well known in the art heat pumping devices basically consist of a closed circuit having means for compressing a heat conveying fluid, condenser means for condensing said fluid, means for expanding said fluid, and means for evaporating said fluid. The evaporator means are in heat exchanging contact with a fluid or a body containing heat energy of a comparatively low temperature, which is absorbed by the heat carrying fluid of the heat pumping device by causing the heat carrying fluid to evaporate at a reduced pressure and a low temperature. After having passed through the evaporator means, said heat carrying fluid is compressed by the compressor means to raise the pressure and the temperature thereofto the desired higher level, and it is then fed into said condenser means, which is in direct or indirect heat exchanging contact with the object or space to be heated. When the heat is thus absorbed from the heat carrying fluid, the same will be condensed within said condenser means. Thereafter, the heat carrying fluid is expanded in said expansion means to a reduced pressure and to a temperature lower than that of the fluid or body supplying the low-temperature energy. The heat carrying fluid is then returned to the evaporator means for absorbing further low-temperature energy, and the cycle is repeated.

The function of a heat pumping device is thus, in short, to raise the temperature of a quantity of energy. The smaller this raise of the temperature has to be, the smaller amounts of expensive energy will be required for attaining the higher temperature level, i.e. for operating the said compresser means. It has until the present invention been assumed that, as an example, it would be necessary to raise the pressure and the temperature of the heat carrying gas in the compressor means to such a high level, that the coldest part of the condenser means will have a temperature of at least 20° C. in order to raise the temperature of air flowing through a conventional cooler having a built-in condenser from 0° C. to 20° C. (In this example the condensation probably takes place between +35° C. and +25° C.) The temperature of the gas immediately after the compression is also much higher because of inevitable overheating of part of the gas. Similar considerations, although reversed as to the temperature conditions, apply to the evaporator means of the heat pumping device, wherein an evaporation temperature is assumed and chosen, which in total is lower than the lowest temperature of the low-temperature energy, in spite of the fact that a great pat of this energy at the start has a considerably higher temperature.

BRIEF DESCRIPTION OF THE INVENTION

It is an object of the present invention to provide an improved heating system comprising a heat pumping device having modified condenser and evaporator means making the heat pumping device operate more efficiently.

Another object of the invention is to provide an energy-saving heating and ventilation system for heating and ventilating objects or spaces surrounded by an outer covering, such as walls and roofs of buildings.

These and other objects and advantages of the invention will be explained in further detail below.

According to one aspect of the invention the condenser and the evaporator means of a heat pumping device included in a heating system are divided into at least two separate sections, which are connected in series. The series connected sections of the condenser are arranged to operate at progressively decreasing temperatures, whereas the series connected sections of the evaporator are arranged to operate at progressively increasing temperatures, said temperatures being chosen with regard to the temperature gradient of the outer covering of the object or space to be heated. Each individual section of said condenser and evaporator means respectively is in heat exchanging communication with a corresponding slit or passage extending through said outer covering, substantially in parallel with the outer surfaces thereof and at different distances from said surfaces. Those of the slits or passages, which communicate in a heat exchanging relationship with said sections of the condenser means, are interconnected in series, and the slits or passages communicating in a heat exchanging relationship with said sections of the evaporator means are series connected in a similar manner. The slits or passages corresponding to the condenser means are preferably arranged in heat exchanging contact with the slits or passages corresponding to the evaporator means.

The individual sections of the condenser means and the evaporator means may either be located within said slits or channels or be located outside said outer covering. In the former case the condenser and evaporator means are thus built-in in the outer covering, whereas said means in the latter case may form—together with the remaining parts of the heat pumping device—a separate heat pumping unit having a plurality of condenser sections, each heat exchangingly communicating with a corresponding slit or passage in the outer covering, and a plurality of evaporator sections, each heat exchangingly communicating with a corresponding slit or passage in the outer covering. It should be understood that said slits or channels may extend along the entire outer covering or be located only in certain areas thereof. The slits or channels may be formed in a number of different ways using different kinds of material and weak and inexpensive dimensions, as they will not be subjected to any essential pressure. The slits or passages may, for example, be formed by thin tubes of plastics, metal or other suitable material. The areas within the outer covering, which are not occupied by said slits or passages, preferably contain a suitable heat insulating material such as glass or mineral fibre wool.

The use according to the invention of a plurality of condenser and evaporator sections operating at progressively decreasing (condenser) or increasing (evaporator) temperatures and contacting an air flow of correspondingly varying temperatures, increases the spectrum of useful heat conveying fluids and results in a considerably increased efficiency, requiring only a minimum of expensive energy for operating the compressor. This is due to the fact that the flow of air (the same flow of air) passes the condenser sections in series and is heated step-wise, resulting in a considerably lower average temperature of the condenser than in conventional heat pumping devices. For example, heating air from 0° C. to +5° C. would only require a condenser section being cooled from not more than about +10° C., and so on. Similar cnsiderations apply to the evaporator part.

Similar considerations also apply to the heating of the outer covering as such. Thus, the transmission losses through the covering need not be replaced to 100 percent by heating from the inside as is done at present, but heat energy may be supplied progressively from the outside and inwards with progressively—or step-wise—increasing temperatures. The division into a plurality of (i.e. at least two) slits or passages having separate supply of heat energy to each slit lowers the average temperature of the energy required for the heating, and the amount of air for heating the space inside of the outer covering as such can be strongly limited. The amount of air required for the heat distribution, i.e. for cooling the condenser and for transferring energy to the evaporator, can be accomplished by means of the fan system for the necessary fresh air and ventilation in a common function.

The low-temperature energy used in the system according to the invention can be supplied from a variety of sources, which are readily available. A preferred low-temperature energy source is an accumulator of the type described in my co-pending application Ser. No. 808,143, filed June 20, 1977, now abandoned, said heat accumulator comprising a water absorbing mass, preferably buried in the ground, which can be loaded with e.g. waste heat, transmission heat, solar heat, etc. The heating system according to the invention may also comprise a solar heat system for direct or indirect heating of the heat conveying air.

DESCRIPTION OF PREFERRED EMBODIMENTS

Figure 1:
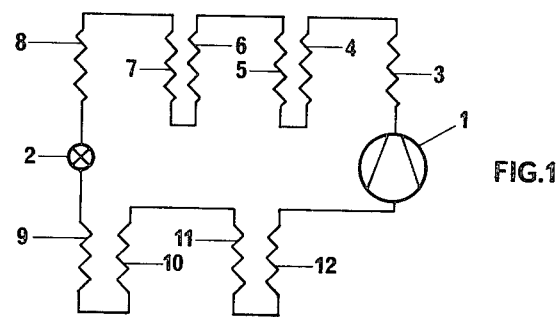
Figure 2:
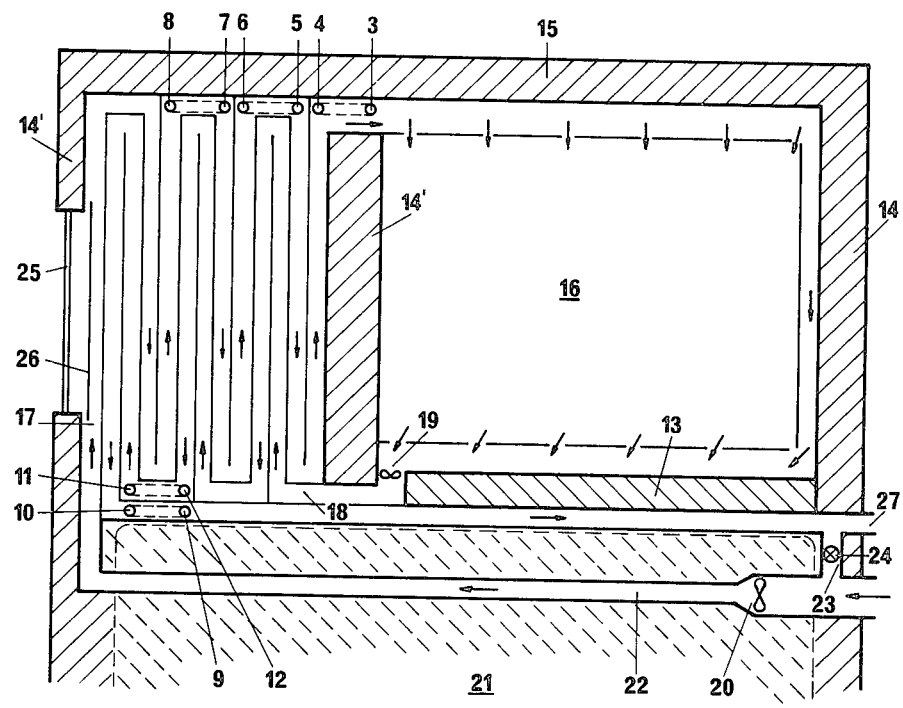

Some preferred embodiments of the invention will be described in the following with reference to the accompanying drawings, in which FIG. 1 is a schematic diagram illustrating the principle of the heat pumping device used in the heating system according to the invention, and FIG. 2 is a schematic view illustrating a building provided with a heating and ventilation system according to the invention.

In FIG. 1 there is shown a heat pumping device comprising a compressor 1 and an expansion valve 2. According to the invention the condensor of the heat pumping device is divided into a plurality of condenser sections 3–8 which are connected in series. Similarly the evaporator has a plurality of series connected evaporator sections 9 to 12. The condenser sections 3 to 8 are arranged such that heat emission takes place with gradually decreasing temperatures on the cooling surfaces of the condenser from section 3 to section 8. Similarly the temperatures on the heat absorbing surfaces of the evaporator gradually—or stepwise—increase from evaporator section 9 to evaporator section 12. In this manner the required difference between the temperature of condensation and the temperature of evaporation is reduced, thereby increasing the heat factor.

In FIG. 2 there is schematically shown a building having a floor 13, walls 14, 14' and a roof 15, said parts defining a space 16 to be heated. The width of the wall 14' is shown considerably enlarged in order to illustrate the composition of the wall. At least a part of the outer covering formed by the parts 13, 14, 14' and 15 are built up according to the principle illustrated by the wall 14'. Said wall has a first system 17 of air channels, slits, passages, tubes, or the like for circulating heating and ventilation air through the wall 14' into the space 16 to be heated and ventilation, and a similar second system 18 for recirculating the air from the space 16 through the wall. Each of the air circulation systems 16 and 17 has a plurality of sections located at varying distances from the outer surfaces of the wall 14'. The condenser sections 3 to 8 of the heat pumping device illustrated in FIG. 1 are located in said first air circulation system 17 with the first condenser section 3 located closest to the space 16 and the condenser section 8 closest to the outer surface of the wall 14'. The evaporator sections 9 to 12 are located in the air recycling system 18 such that the recycled air first contacts evaporator section 12, then evaporator section 11, and so on. The two air circulation systems 17 and 18 are preferably arranged in heat exchanging contact with each other, and the areas of the wall 14', which are not occupied by said systems 17 and 18, are preferably filled with bodies of suitable heat insulating material (not shown). Air is circulated in the system by means of fans 19 and 20. In the shown embodiment low-temperature energy is supplied to the circulating air from a heat accumulator 21, which is buried in the ground under or close to the building and which may comprise water soaked peat material or the like, the inlet air being passed through the accumulator 21 through suitable tubing 22 in heat exchanging contact with the accumulator 21. The inlet air may be fresh air and/or air discharged from the air circulation system 18, which may be fed into the inlet conduit 22 in controllable amounts by means of a conduit 23 having an adjustable valve 24. The system may also comprise a solar energy collector 25 and a black or dark surface 26 located in the air stream of the system 17.

The described embodiment of the heating and ventilation system according to the invention operates in the following manner: Fresh air (and/or discharged air taken from the conduit 23) is by means of the fan 20 passed through the tubing 22, where (when the inlet air is cooler than the accumulator 21) the inlet air is preheated by the low-temperature heat energy stored in the accumulator 21. Further heating of the inlet air takes place when the air passes the solar heat collector 25 and surface 26. The air is then progressively heated when in turn passing condenser sections 8 to 3 and preferably also by the heat exchanging contact with the air in the recirculation system 18. The wall 14' is at the same time heated progressively from the outer surface to the inner surface thereof. Finally, the heated inlet air passes to the room or space 16, which is heated, on the one hand, indirectly through the slits or channels located closest to the inner side of the wall 14', and, on the other hand, directly by the heated air supplied to the space 16 through, for example, ventilation openings located at appropriate locations at the ceiling of the space 16. The air is then passed into the return system 18 in a suitable manner, for example via suitable openings at the floor of the space 16, and the fan 19 brings the air into the return system 18, where it is preferably heat exchanged against the inlet air flowing in the circulation system 17. Before leaving the wall 14' the return air in the system 18 is contacted with in turn evaporator section 12, evaporator section 11, etc., wherein the necessary heat energy is withdrawn from the air. The cooled air is then discharged through opening 27 and/or recirculated via the circuit 23.

The invention is not limited to the embodiments described above and illustrated in the drawing, but many variations and modifications can be made within the scope of the invention.

What I claim is:

1. A system for heating and ventilating objects and spaces in buildings surrounded by an outer wall, said system comprising:
   (a) a heat pumping device having condenser means for heating air to be used for heating said objects and spaces, evaporator means for recovering heat energy from the air discharged from said spaces and objects and means for circulating the air;
   (b) first and second air circulating passages, each of the passages comprising a plurality of separate channels in the wall, channels of the respective passages being arranged alternately, at varying distances from the outer surfaces of the wall, in heat exchanging relationship with one another;
   (c) the evaporator means comprising a plurality of series-connected sections, each of the evaporator sections being disposed in heat exchanging relationship with one of the channels of the first passage, each of said evaporator sections operating at different temperatures; and,
   (d) the condenser means comprising a plurality of series-connected sections, each of the condenser sections being disposed in heat exchanging relationship with one of the channels of the second passage, each of said condenser sections operating at different temperatures
   (e) whereby the circulating air;
      (1) passes the condenser sections one after another, heat emission to the air taking place with stepwise increasing temperatures,
      (2) passes said spaces and objects after being heated by said condenser sections, and,
      (3) passes said evaporator sections one after another, giving off heat to the evaporator sections at stepwise decreasing temperatures, thereby achieving lower average operating temperatures.

2. A heating and ventilation system according to claim 1, wherein said condenser sections are located inside the corresponding air channels of said first air circulation system.

3. A heating and ventilation system according to claim 1, wherein said evaporator sections are located inside the corresponding air channels of said second air circulation system.

* * * * *